July 15, 1969      K. J. LATIMER      3,454,985

PRESSURE AND HEAT TRANSFER APPARATUS

Filed April 24, 1967      2 Sheets-Sheet 1

INVENTOR.
KENNETH J. LATIMER
BY Harry A. Herbert Jr
William J. O'Brien
Attorneys July 15, 1969    K. J. LATIMER    3,454,985
PRESSURE AND HEAT TRANSFER APPARATUS
Filed April 24, 1967    2 Sheets-Sheet 2
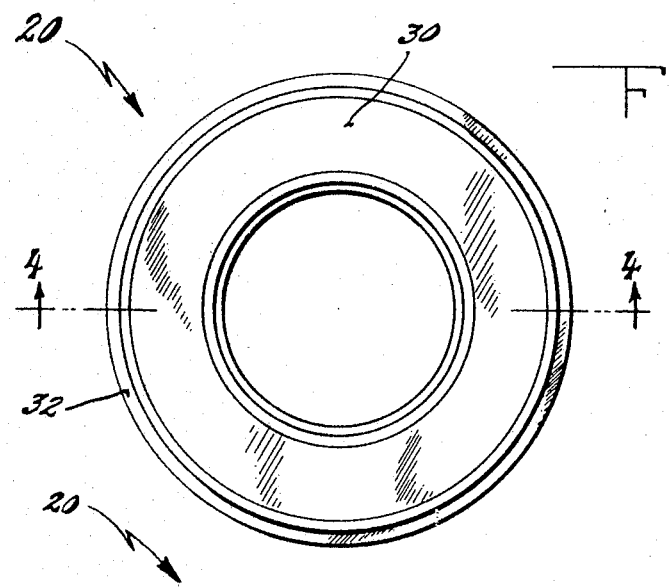
FIG.3
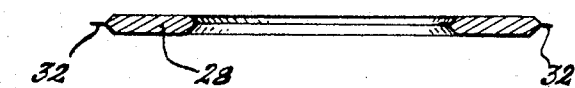
FIG.4
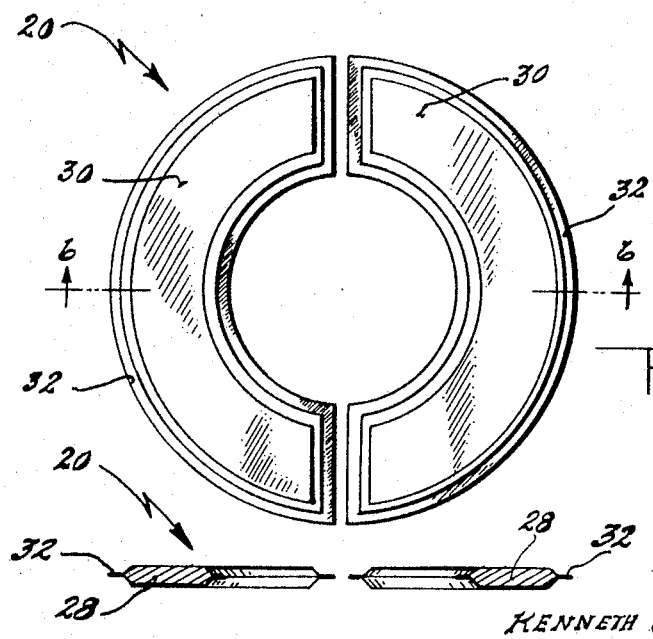
FIG.5
FIG.6
INVENTOR.
KENNETH J. LATIMER
BY Harry A. Herbert Jr.
William J. O'Brien
Attorneys

United States Patent Office 3,454,985
Patented July 15, 1969

3,454,985
PRESSURE AND HEAT TRANSFER APPARATUS
Kenneth J. Latimer, Salt Lake City, Utah, assignor to the United States of America as represented by the Secretary of the Air Force
Filed Apr. 24, 1967, Ser. No. 634,062
Int. Cl. B29h 5/00, 9/10
U.S. Cl. 18—17                                         3 Claims

ABSTRACT OF THE DISCLOSURE

An apparatus and means for effecting the vulcanization of materials having an uneven surface configuration or for bonding vulcanizable materials to substrates having an uneven or irregularly shaped surface. The apparatus comprises a conventional vulcanizing apparatus substantially formed by means of two plates, between which is inserted the material to be treated. The apparatus is modified by inserting a heat and pressure transfer wafer between the material to be treated and one of the plates. The wafer comprises a deformable metal shell filled with a low melting point alloy and adapted to conform to the irregular surface of the vulcanizable material or substrate upon the application of predetermined amounts of pressure and heat.

---

This invention relates to a heating and compressing apparatus that utilizes the combined effect of heat and pressure to effect curing or vulcanization. More particularly, this invention relates to a combined heating and compressing apparatus that finds particular utility in effecting the vulcanization of sheet materials that possess a non-uniform surface configuration. This invention also finds utility in bonding vulcanizable sheet materials to substrates having an uneven surface.

Heretofore, the vulcanization or curing of irregularly shaped surfaces encountered many serious difficulties because the press platens employed as components of the conventional vulcanizing apparatus of the prior art possessed very smooth surfaces. Consequently, materials having non-uniform or irregularly shaped surface configurations could not be cured effectively because the smooth platens could not apply the necessary heat and pressure required for curing the valleys and voids found on an uneven surface. These surface areas would receive only a partial cure or bond.

Accordingly, the primary object of this invention is to provide an apparatus adapted to provide heat and pressure to a material to be vulcanized under predetermined conditions of pressure and temperature over a fixed period of time.

Another object of this invention is to provide an apparatus particularly adapted for applying predetermined amounts of heat and pressure to all surface areas of a material having an irregularly shaped surface configuration.

Still another object of this invention is to provide an apparatus adapted to effect a bond between a vulcanizable material and a substrate in which either or both of the material and the substrates possess an uneven surface configuration.

The above and still other objects and advantages of the invention will be more fully understood upon consideration of the following detailed description thereof taken in connection with the accompanying drawings wherein:

FIGURE 3 is a top view of another form of the heat and pressure transfer wafer disclosed in FIGURE 2;

FIGURE 4 is a sectional view taken along the line 4—4 of FIGURE 3 looking in the direction of the arrows;

FIGURE 5 is a top view of still another form of the pressure and heat transfer wafer of FIGURE 2; and FIGURE 6 is a sectional view taken along line 6—6 of FIGURE 5, looking in the direction of the arrows.

Similar reference characters indicate corresponding parts throughout the several views in the drawings.

In accordance with this invention, a conventional platen press substantially formed of two relatively movable plates or platens and upright members arranged through passages along the sides of the plates is modified by inserting a deformable metal wafer between the platens and a material which is to be vulcanized by the combined effects of heat and pressure generated by the apparatus. During operation, the pressure and heat are applied to the wafer causing it to assume the configuration of the uneven surface of the material being treated. As a consequence, the required amount of heat and pressure needed to effect vulcanization is distributed evenly over the entire uneven surface, thereby minimizing the possibility of having partly cured portions.

Figure 1:
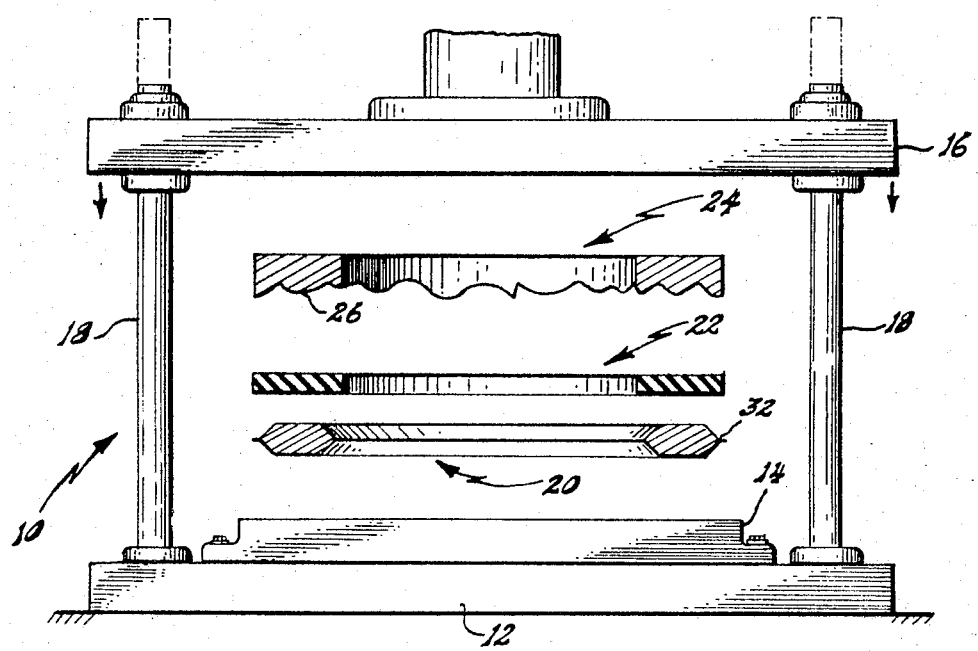
FIGURE 1 is a side elevational view, partly in section, disclosing one form of the invention.
Figure 2:
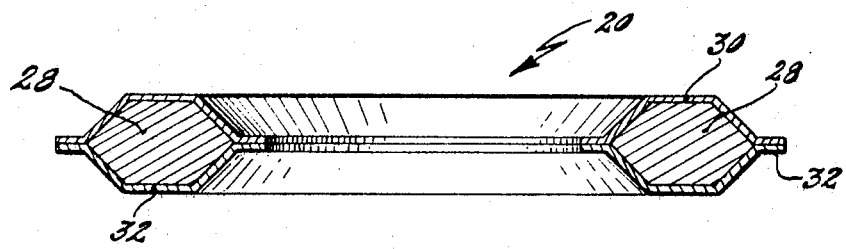
FIGURE 2 is an enlarged view, partly in section, disclosing one form of the heat and pressure transfer wafer for use in the device of FIGURE 1.

With reference to the drawings, particularly FIGURES 1 and 2 which illustrate one embodiment of the invention, there is disclosed a platen press apparatus 10 comprising a base plate 12 upon which is supported a stationary press plate 14 and a movable press plate 16, together with means not shown to transmit power to the press plate 16 so that a uniform rate of movement will be transmitted between the plates 14 and 16 to apply pressure to a material undergoing treatment. The platen press 10 may be of conventional design and can assume various dimensions and construction details depending upon the type of treatment being effected. The pressure plates 12 and 14 may be heated in any known manner, but preferably by means of electrical resistances arranged within the plates. The material to be treated or vulcanized is placed between the press plates and a predetermined pressure and temperature is then applied to effect vulcanization. The movable press plate 16 is supported and slideably engaged on the base 12 by means of four equally spaced standards 18. Heating means for heating the press plates, as well as motor means for transmitting movement to the plate 16, are not shown. The press platen 10 of this invention is modified by inserting a pressure and heat transfer wafer 20 between the material 22 to be treated and the press plate 14. As illustrated in FIGURE 1, the apparatus is employed to effect a vulcanizable seal between the vulcanizable material 22 and a non-vulcanizable material 24 possessing an irregularly shaped surface configuration, as illustrated by reference numeral 26.

The wafer 20 may assume numerous shapes, as illustrated by FIGURES 2 to 6, inclusive. In general, however, the wafer 20 comprises a shell-like structure of substantially annular configuration with a hollow portion 28 filled with a low melting point alloy. The material 22, which is to be bonded to the uneven surface 26, is placed within the apparatus 10 with the wafer positioned between the press plate 14 and the material 22. The material to be vulcanized is put under pressure, heated to vulcanizing temperature, and held for the required time to effect vulcanization. The low melting point alloy melts and allows the wafer to conform to the configuration of the uneven surface 26 which allows for a uniform transfer of pressure and heat, thereby effecting a complete vulcanizable bond.

FIGURES 2 through 6 disclose various forms of the wafer 18 of this invention. The wafer comprises a thin shell 30 of a deformable metal material, such as stainless steel with a hollow portion filled by a low melting point alloy. Cerrobend, an alloy having a melting point of 158° F., has proved to be suitable for many applications. The melting point of the alloy is not critical, however, provided it is below temperature necessary to cure the material being vulcanized. FIGURES 3 and 4 disclose a doughnut-shaped configuration, while FIGURES 5 and 6 disclose two half-doughnut shapes. The shells 30 are seam-welded together except for a narrow area on one edge, as shown at 32, and installed in a restraining mold to hold it in shape. The alloy 28 is melted and poured into the shell and allowed to solidify. Then the narrow opening 32 is seam-welded to seal the shell and form the heat and pressure transfer wafer 20.

This invention provides a unique means for applying pressure and heat to uneven surfaces during vulcanization or other bonding operations and eliminates the problems presently encountered in attempting to cure materials having uneven surface configurations. It finds many applications and has been found to be especially useful for vulcanizing rubber shrinkage liners to the rubber boot around the ports of rocket motor cases.

While certain specific embodiments have been described, it is obvious that numerous changes may be made without departing from the general principle and scope of the invention.

I claim:
1. In a vulcanizing apparatus having in combination a base member providing a support, a pair of cooperating press platens affixed to said support, means for heating and causing relative movement between said platens, a vulcanizable material positioned in a sealable relationship adjacent to a non-vulcanizable material having an irregular shaped surface, and said adjacent materials located between said platens, the improvement which comprises positioning a heat and transfer wafer between said adjacent materials and at least one of said platens, said wafer comprising a hollow casing conforming generally in shape to that of the outer periphery of said non-vulcanizable material having a pair of opposed shell members of a deforable metal with a low melting point alloy filling the hollow portion of the casing.

2. A pressure and heat transfer wafer for use with a vulcanizing apparatus comprising a pair of mutually opposed sheet metal members spaced from one another to form a hollow volume therebetween, said members being joined along their outer periphery and a low melting point metal alloy filling the said hollow volume.

3. A pressure and heat transfer wafer in accordance with claim 2, wherein the central portion of said members are joined together such that the said alloy is confined between the joinder at the outer periphery and the joinder at the center.

References Cited
UNITED STATES PATENTS

| | | |
|---|---|---|
| 1,206,093 | 11/1916 | Chapman. |
| 2,404,165 | 7/1946 | Carver. |
| 2,874,751 | 2/1959 | Norton. |
| 2,916,771 | 12/1959 | Lang et al. |
| 2,973,790 | 3/1961 | Huette. |
| 3,315,310 | 4/1967 | Weissman. |
| 3,383,737 | 5/1968 | Greger. |
| 3,384,928 | 5/1968 | Boeker. |

J. HOWARD FLINT, JR., Primary Examiner

U.S. Cl. X.R.

18—34; 249—111